United States Patent Office 2,781,371
Patented Feb. 12, 1957

2,781,371

DETERGENT SULPHONIC ACID AND SULPHATE SALTS OF CERTAIN AMPHOTERIC DETERGENTS

Hans S. Mannheimer, New York, N. Y.

No Drawing. Application February 2, 1956,
Serial No. 562,940

8 Claims. (Cl. 260—401)

This invention relates to novel compositions and to methods for producing them. In one of its more specific aspects, the invention is directed to the method of making and to novel derivates of metal salts of substituted amido, amino acids, to which I shall hereinafter refer to as "amino acid metal salts."

Said "amino acid metal salts" have been found useful as detergent, foaming, wetting, emulgating, emulsifying and dispersing agents. They are surface active agents, and serve as excellent synthetic detergents, dye assistants and softeners in the textile and related fields.

Said "amino acid metal salts," employed as starting materials in the practice of this invention, have the following general Formula I:

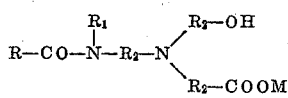

in which R is an organic radical, which, if connected to a carboxyl group, provides a monocarboxylic acid, and said radical contains at least 4 carbon atoms and for most purposes is a hydrocarbon radical of 4–18 carbon atoms; $R_1$ is hydrogen or an aliphatic hydrocarbon radical having 1–4 carbon atoms, such as —$CH_3$, —$C_2H_5$, —$C_3H_7$, and —$C_4H_9$ or any one of said radicals having one or more of the hydrogens thereof which has been hydroxy substituted, illustrative examples of which are —$C_2H_4OH$, —$CH_2CHOHCH_3$, —$CHOHCHOHCH_2OH$ or any one of said radicals, but of 2–4 carbon atoms and whose hydrogens have been either unsubstituted or hydroxy substituted and having a single ether (—O—) or keto (—CO—) linkage therein, illustrative examples of which are —$C_2H_4$—O—$CH_3$, —$C_2H_4$—O—$C_2H_4OH$,

—$CH_2CHOH$—O—$C_2H_5$, —$CH_2$—CO—$CH_3$

—$C_2H_4$—CO—$C_2H_4OH$, —$CH_2OH$—CO—$C_2H_5$; $R_2$ is a hydrocarbon group having 1–4 carbon atoms, such as —$CH_2$—, —$C_2H_4$—, —$C_3H_6$— and —$C_4H_8$—, or any one of the aforesaid groups, any one or more of whose hydrogens has been hydroxy substituted, illustrative examples of which are

—$CH_2CHOHCH_2$—, —$CH_2CHOHCHOHCH_2$— and preferably such hydrocarbon groups of 3 and 4 carbon atoms, wherein one or more of the hydrogen atoms thereof not attached directly to the terminal carbon atoms of said groups have been hydroxy substituted, or any one of said groups, but of 2–4 carbon atoms and whose hydrogens have been either unsubstituted or hydroxy substituted and having a single ether (—O—) or keto (—CO—) linkage therein; M is a metal and preferably an alkali metal and, for most purposes, is sodium or potassium.

Said "amino acid metal salts" may be produced in a number of different ways:

One of the methods which may be employed is to first react an hydroxy diamine with an organic acid in the molecular proportion of 1 to 1. When approximately 1 mole proportion of water of reaction has been formed and the acid number of the mass is zero, the reaction is terminated, and the resulting reaction mass under specific and controlled conditions is reacted with a metal salt of a monohalomonocarboxylic acid to provide an "amino acid metal salt" defined in Formula I.

The organic acid reacted with said diamine is one containing a single COOH group or any of the available anhydrides of said acids and by the term monocarboxylic organic acid as used herein, I mean to include both the acid and the anhydride thereof which I regard as the equivalent of the acid. These acids may be: the aliphatic open chain saturated or unsaturated fatty acids as well as said fatty acids containing hydroxy or keto groups and/or other substituents, such as aryl radicals, as for example, acids of the type of Twitchell fatty acids; cycloaliphatic carboxylic acids preferably containing no more than 4 condensed nuclei and examples of which are hexahydrobenzoic, resinic, and naphthenic acids; heterocyclic aliphatic carboxylic acids, such as the various pyridine carboxylic acids.

While carboxylic acids having any number of carbon atoms may be employed, I prefer to employ those having at least 5 carbon atoms and preferably 5–19 carbon atoms in straight chain relationship. The acids which I employ may be derived from a number of different sources. Among some of them are the acid components chosen from oil or fats of animal, marine or vegetable origin and these include; the acids of coconut, palm kernel and palm oil, also from soy bean, linseed, olive, rapeseed, cottonseed, peanut and castor oil which contain large proportions of unsaturated hydroxy fatty acids and also the acids derived from tallow, fish and seal oils, whale or shark oils and the hydrogenated acids from these sources. Moreover, the synthetic high molecular weight fatty acids, obtained by the oxidation of paraffin wax and similar high molecular weight hydrocarbons by means of gaseous oxidizing agents may be employed. In addition the acid may be one of the resinic acids, such as abietic acid, or the naphthenic acids and long chain fatty acids having an aromatic hydrocarbon radical connected directly with the aliphatic chain (Twitchell fatty acids) as are obtainable from oleic, ricinoleic, linoleic and similar unsaturated fatty acids. Instead of employing mixture of acids from oil, fats and resins, single acids may be used, for example, caproic, myristic, heptylic, caprylic, undecylic, lauric, palmitic, stearic, behenic, arachic, cerotic, oleic, erucic, linoleic, linolenic, ricinoleic and hydroxystearic acids.

Of the aforesaid diamines I prefer to employ aminoethylethanolamine

hereinafter referred to as reactant A. Because it is commercially available in large quantities, its use provides for efficient production of some of the starting materials.

Examples of some of the other diamines which may be employed in the production of starting materials are methyl amino isopropyl isopropanol amine

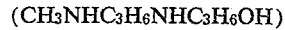

amino isobutyl isobutanol amine

amino hydroxypropyl propane diol amine

propyl amino ethoxy ethyl ethoxy ethanol amine

butyl amino hydroxy propyl acetol amine

ethyl amino propanone ethanol amine $(C_2H_5NHCH_2COCH_2NHC_2H_4OH)$ respectively, hereinafter referred to as reactants, B, C, D, E, F, and G.

The reactants A–G respectively may be produced by employing a number of different classical methods well known to the art. One method consists essentially in reacting ammonia with a compound which is the dichloride of the $R_2$ group between the two nitrogens and has formula $Cl-R_2-Cl$, and subsequently treating the diamine produced with caustic soda to remove HCl which is attached. Then the resultant diamine is reacted with a compound of the formula $Cl-R_2-OH$, and if $R_1$ is other than hydrogen, another reactant $R_1-Cl$ is used. Again, the hydrochloride is removed. In this manner the various diamines employed in the production of my starting materials may be produced and are of the following formula:

$$R_1-NH-R_2-NH-R_2-OH$$

in which $R_1$ and $R_2$ have heretofore been defined.

One of the well-known commercial methods employed in the production of said diamines whose general formula is above set forth is predicated upon the reaction of epoxy compounds, such as ethylene oxide, propylene oxide, etc., with ammonia to form the intermediate diamine which is subsequently reacted with additional epoxy compound in the presence of water.

Among some of the salts of the halo acids which may be employed are the sodium and potassium salts of monochloracetic acid, monochloropropionic acid, monochlorlactic acid, monochlorhydroxyacetic acid obtainable from di-chloracetic acid, monochloracetoacetic acid, monochlorethoxyacetic acid, etc.

One of the general types of method which may be employed for the production of some of these starting materials consists in first reacting one mol of a monocarboxylic acid having at least 4 carbon atoms in its radical connected to its COOH group with one mol of one of said diamines, examples of which are reactants A–F, until only approximately 1 mol of water has been removed. In carrying out this reaction the mixture is first heated to about 110–180° C. in vacuum of 90–130 mm. of mercury pressure until one mol of water of reaction has been produced and removed. (All of the terms "mm." and "mm. pressure" as used in this entire description are intended to mean mm. of mercury pressure.) The reaction mass is then allowed to cool to room temperature and is then at elevated temperatures reacted with a monohalocarboxylic acid in the presence of 2 mols of caustic soda in aqueous solution. In one of its preferred forms one mol of said reaction mass is added to an aqueous solution containing one mol of the monohalocarboxylic and 2 mols of caustic soda, which solution prior to the addition has been prepared and maintained at a temperature no greater than 20° C. The mix is heated to a temperature of 95° F. until the pH has been reduced from about 13 to 8–8.5 and there is no further change in pH upon continued heating at said temperature.

Another method which may be employed for producing starting materials of Formula I in the practice of this invention is as follows:

The reaction mass of the monocarboxylic acid and the diamine, an example of which is product X, is heated to 90–100° C. and there is gradually added thereto an equimolecular proportion of monohalomonocarboxylic acid, such as monochloracetic acid, whereupon exothermic reaction occurs and the temperature rises from 90–100° C. to about 130–160° C. The resultant is allowed to cool to 100° C. and is then dissolved in water. To this solution is added an aqueous solution containing 2 mols of caustic soda for each mol of monochloracetic acid previously used. This mass is stirred for about 15 minutes at a temperature of about 60 C. The resultant product is a reaction product as defined in Formula I.

Still another method which may be employed for the production of the intermediate, known herein as product X, is to react an acid chloride, having the general formula $R-CO-Cl$, R being heretofore defined, with the diamine in the presence of water and caustic soda.

The following are illustrative examples given merely for the purposes of specifically illustrating how some of the starting materials employed in the practice of the present invention may be produced, all parts being given by weight unless otherwise specified:

*Example A*

200 parts of lauric acid and 104 parts of reactant A are placed in a reacting vessel and are heated sufficiently to melt the lauric acid whereupon an agitator located therein is started and mixes and maintains these components in mixed condition. While being constantly agitated the mix is heated under vacuum of about 110 mm. pressure for about 3 hours while gradually raising the temperature to 170° C. During this period 18 parts of water have been formed and distilled off, leaving behind a reaction mass having an acid number of approximately zero. Then this reaction mass, herein known as product X, is allowed to cool to room temperature and the entire mass is added to a previously prepared solution produced by adding 96 parts of monochloracetic acid and 80 parts of caustic soda to 300 parts of water. This solution was prepared and maintained at a temperature below 20° C. before the addition of said reaction mass. This mixture is heated to 95° C. and maintained at this temperature for 2 hours. During this period the pH of the mix is reduced from approximately 13 to 8–8.5. At the end of this period the pH of this mass is no longer subject to change by continued heating at said temperature and a sample of the resulting product is water soluble to a sparkling clear solution. At the end of this period, the mass consists chiefly of a water solution of one of my starting materials, hereinafter known as product A and having the following formula:

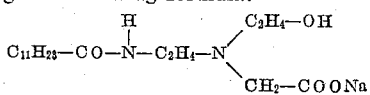

*Example B*

To the aqueous mass produced under the method of Example A and containing 389 parts of my product A, whose formula is defined therein, there is added an aqueous solution consisting of 40 parts of caustic soda dissolved in 40 parts of water. Then to said mixture there are added 80.5 parts of chlorhydrin. This mixture which at this stage is at room temperature is heated over a period of 1 hour to 95° C. The mass is subsequently maintained at this temperature of 95° C. until there is no change in pH, this taking approximately 2 to 3 hours. The reaction mass consists essentially of an aqueous solution of another one of my starting materials, hereinafter known as product B, and having the formula which is the same as that of Example A, except that $$C_2H_4-O-C_2H_4-OH$$

is substituted for $C_2H_4-OH$.

*Example C*

172 parts of capric acid and 104 parts of reactant A are heated and reacted under the same condition as given in Example A, and 240 parts of the reaction mass produced thereby are introduced into a solution of 110 parts of monochlorpropionic acid and 80 parts of caustic soda in 300 parts of water prepared and maintained below 20° C. The resulting mixture is then heated under the same conditions as outlined in Example A until the resulting product forms sparkling clear aqueous solutions and is no longer subject to pH change in continued heating. At the end of this period the mass consists chiefly of an aqueous solution of one of my starting materials, hereinafter known as product C, and having the formula the same as that of Example A, except that $C_9H_{19}$ is substituted for $C_{11}H_{23}$ therein, and $C_2H_4$ for the $CH_2$.

Example D 282 parts linseed fatty acid and 104 parts reactant A are treated in the same manner as described in Example A. The entire reaction mass is then processed with an aqueous solution of 96 parts monochloracetic acid and 80 parts of caustic soda previously made and maintained below 20° C. and subsequently processed in the manner of Example A to produce starting material, hereinafter known as product D, and having the same formula as that of Example A except that $C_{17}H_{31}$ is substituted for $C_{11}H_{23}$ therein.

Example E 116 parts of caproic acid and 104 parts of reactant A are condensed in the manner as described in the previous examples and the resulting reaction mass is subsequently processed in the same manner as that set forth in the processing of that of Example A.

The reaction product has the same formula as that of Example A, except that $C_5H_{11}$ is substituted for $C_{11}H_{23}$ therein, and is hereinafter known as product E.

Example F 284 parts of stearic acid and 104 parts of reactant A are heated in the like manner as described in previous examples, and the resulting reaction mass is then introduced into an aqueous solution of 110 parts monochlorpropionic acid and 80 parts of caustic soda. The process is carried out in the same manner as described in the previous examples and there is produced a product having the same formula as that of Example A, except that $C_{17}H_{35}$ is substituted for $C_{11}H_{23}$ and $C_2H_4$—COONa is substituted for the $CH_2$—COONa therein, and is hereinafter known as product F.

Example G 290 parts dodecyl benzoic acid and 104 parts of reactant A are condensed in the manner described in Example D and the resultant mass is processed in the manner of Example D, whereby there is produced a novel compound having the same formula as that of Example A, except that $C_{12}H_{25}C_6H_4$ is substituted for $C_{11}H_{23}$ therein, and is hereinafter known as product G.

Example H 228 parts of myristic acid and 104 parts of reactant A are reacted in the manner described in Example D and the resultant mass is processed in the manner of Example D, whereby there is produced a starting material hereinafter known as product H, and having the same formula as that of Example A, except that $C_{13}H_{27}$ is substituted for $C_{11}H_{23}$ therein.

Still another type of method may be employed to produce some of these compounds, and examples thereof are shown hereinafter merely in an illustrative and not in a limiting sense.

Example J 1 mol of lauric fatty acid and 1 mol of ethylenediamine ($NH_2C_2H_4NH_2$) are added together and then heated in the presence of an inert solvent such as toluol in amounts sufficient to dissolve the same. This solution is maintained at a temperature of approximately 110° C. This heating is carried out under a condenser through which pass vapors which consist of some of the solvent and water of reaction as well as small amounts of unreacted amine. These products are caught in a collector from which the water of reaction is removed and the condensed toluol and collected amine are returned to the reacting vessel. The temperature of the mass is maintained at 110° C. under the aforesaid conditions until 0.9 mol of water is collected. Then a vacuum of approximately 90 mm. of mercury is applied to the reacting vessel and the temperature maintained at 110° C. until all of the solvent and an additional 0.1 mol of water have been removed. To the resulting mass is added 1 mol of monochloracetic acid and this mixture is heated to a temperature of approximately 120° C., whereupon the temperature of the mass will spontaneously rise to 170° C. By the application of external heat the mass is maintained at said temperature at approximately 170° C. until a one part sample thereof when dissolved in 100 parts of aqueous solution of sodium hydroxide having a pH of approximately 9 provides a clear solution. 1 mol of this mass so produced is added to an aqueous solution containing 1 mol of sodium hydroxide. The entire mass is heated to approximately 80° C. whereupon there is formed the sodium salt of said mass, having the following formula:

$$C_{11}H_{23}\text{—CO—NH—}C_2H_4\text{—NH—}CH_2\text{—COONa}$$

The aforesaid salt, whose structural formula is shown in this example may be produced in still another way. Instead of adding the monochloracetic acid at the stage previously shown, there first may be prepared an aqueous solution containing 2 mols of sodium hydroxide and one mol of monochloracetic acid. The temperature of this solution is reduced below 15° C. and preferably 5 to 10° C. and while maintained at said reduced temperature and being constantly agitated there is added thereto one mol of the lauric acid-ethylene diamine reaction mass. While being constantly agitated, the temperature of the mass is raised over a one hour period to about 95° C. Then the temperature of this constantly agitated mass is maintained at 95° C. for an additional 3 hours or until a sample thereof in 100 parts of water will be clear and the pH is no longer subject to change on further heating of the mass at that temperature.

1 mol of the last defined compound is added to a solution containing one mol of caustic soda and one mol of chlorhydrin dissolved in water at a temperature not exceeding 15° C. and preferably between 5 to 10° C. After the addition at said low temperature, the mass is continuously agitated and while in the state of agitation its temperature is raised over about a one-hour period to 95° C. and is further continuously agitated and maintained at said temperature for an additional 3 hours, all of this being done under a reflux condenser. During said 3 hour period, the pH of the mass continuously decreases. At the expiration of that 4 hour period the pH of 1 part of the mass when dissolved in 100 parts of water will be 8.5. The 1 part sample when dissolved in 100 parts of water and having a pH of 8.5 in the water, provides a clear solution and is the same product as that of Example A.

Example K

By following the same procedure as that set forth in Example J with the only difference being that one mol of glycerine chlorhydrin ($CH_2Cl$—$CHOH$—$CH_2$—$OH$) is substituted for the mol of ethylene chlorhydrin there is produced another one of my starting materials, hereinafter known as product K, and having a formula the same as that of Example A, except that $CH_2CHOHCH_2OH$ is substituted for $C_2H_4OH$ of Example A.

Example L

By following the same procedure as that set forth in Example J with the only difference being that one mol of pentaerythritol chlorhydrin ($CH_2ClC(CH_2OH)_3$) is substituted for the mol of ethylene chlorhydrin there is produced another one of my starting materials, hereinafter known as product L, and having a formula the same as that of Example A, except that $$\text{—}CH_2C(CH_2OH)_2OH$$

is substituted for —$C_2H_4OH$ of Example A.

Example M

By following the same procedure as that set forth in Example J with the only difference being that one mol of dimethylhydroxy ketone chlorhydrin

(ClCH₂—COCH₂—OH)

is employed instead of the one mole of ethylene chlorhydrin there is produced another one of my starting materials, hereinafter known as product M, and having a formula the same as that of Example A, except that

CH₂COCH₂OH is substituted for C₂H₄OH of Example A. The ketone employed in this example may be prepared by employing the well-known method consisting essentially of the distillation of 2 mols of hydroxy acetic acid with one mol of calcium carbonate after which the ketone is chlorinated to provide the above reactant.

Example N

By following the same procedure as that set forth in Example J with the only difference being that, instead of employing one mol of ethylene chlorhydrin, there is employed one mol of the following compound:

$$ClCH_2COCH\diagup^{OH}_{\diagdown OH}$$

there is produced another one of my starting materials, hereinafter known as product N, and having the same formula as that of Example A, except that

CH₂COCHOHOH is substituted for C₂H₄OH of Example A. The particular ketone reactant employed in this example may be produced by the distillation of one mol of dihydroxy acetic acid, one mol of hydroxy acetic acid and one mol of calcium carbonate after which the distillation product is chlorinated.

Example P

By following the same procedure as that set forth in Example J with the only difference being that one mol of monochlorlactic acid (CH₂Cl—CHOH—COOH)

is employed instead of the one mol of monochloracetic acid so that there is produced still another of my starting materials, hereinafter known as product P, having the same formula as that of Example A, except that CH₂CHOHCOONa is substituted for CH₂COONa of Example A. In this production I prefer to use the aqueous method as set forth in Example J.

Example Q

Employing the same procedure as that set forth in Example A, except that 1 mol of capric acid and 1 mol of reactant B and 1 mol of monochlorpropionic acid are substituted for the lauric acid, reactant A and monochloracetic acid, so that there is produced a starting material, hereinafter known as product Q, having the following formula:

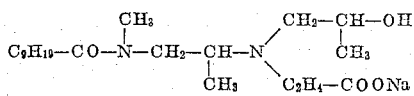

Example R

Employing the same procedure as that set forth in Example A, except that 1 mol of stearic acid, 1 mol of reactant C and 1 mol of monochlorlactic acid are employed in place of the lauric acid, reactant A and monochloracetic acid, there is provided a starting material, hereinafter known as product R, having the following formula:

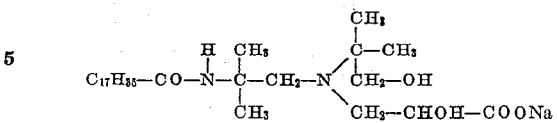

Example S

Employing the same procedure as that set forth in Example A, except that 1 mol of myristic acid, 1 mol of reactant D and 2 mols of potassium hydroxide are used in place of the lauric acid, reactant A and caustic soda are used to provide starting material, hereinafter known as product S, having the following formula:

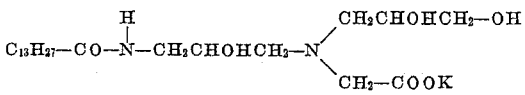

Example T

Employing the same procedure as that set forth in Example A, except that 1 mol of capric acid, 1 mol of reactant E, and 1 mol of monochlorethoxyacetic acid are used in place of the lauric acid, reactant A and monochloracetic acid to provide starting material, hereinafter known as product T, having the following formula:

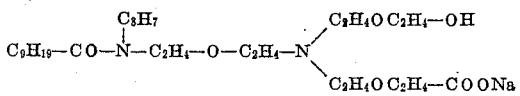

Example U

Employing the same procedure as that set forth in Example T, except that 1 mol of oleic acid, 1 mol of reactant F and 1 mol of monochloracetoacetic acid in place of the lauric acid, reactant A and monochloracetic acid to provide starting material, hereinafter referred to as product U, having the following formula:

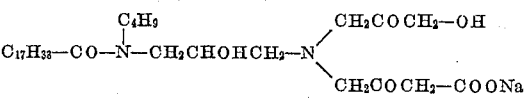

Example V

Employing the same procedure as that set forth in Example A, except that in place of the lauric acid, reactant A and caustic soda, substitute 1 mol of dodecylbenzenemonocarboxylic acid (C₁₂H₂₅—C₆H₄—COOH), 1 mol of reactant G and 2 mols of potassium hydroxide, to provide starting material, hereinafter known as product V, having the following formula:

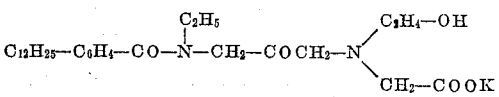

The specific monocarboxylic acids, as well as the specific monohalomonocarbylic acids employed in certain examples, may be replaced by others as may be the various other reactants in the specific examples to provide a great number of other starting materials, which differ from those set forth in the examples heretofore set forth.

Prior to this invention, it was known that cationic surface active agents and anionic surface active agents when together in aqueous solution resulted in the production or formation of water insoluble compounds; and that adding an anionic surface active agent to an aqueous solution of another anionic surface active agent resulted in a mere physical combination of said agents and that no reaction would occur between them.

Said "amino acid metal salts" normally behave anionically in aqueous solutions having a pH above 7, and consequently it was expected that said "amino acid metal salts" when in aqueous solution together with anionic surface agents that they would be combined physically only and that no chemical reaction would occur therebetween. In the course of my experimentations, I have discovered that said "amino acid metal salts" could be reacted with certain anionic surface active agents at a pH above 7 to produce water-soluble reaction products. Nor only did I make said discovery, but I further discovered that water solutions of such reaction products had viscosities greater than corresponding aqueous solutions of the "amino acid metal salts" and also exhibited better foaming characteristics than did said "amino acid metal salts" in very low dilutions under extreme water hardness conditions. Said reaction products are non-toxic and non-irritating to the human skin. They have been found eminently useful as general utility detergents, such as for car washing, dish washing, clothes washing, etc. Said "amino acid metal salts" when used as components of shampoos sometimes caused slight irritation or stinging of the eyes when such shampoos were used and water solutions thereof accidentally reached the eyes. I have further discovered that the reaction products of this invention caused practically no irritation or stinging of the eyes when so employed.

According to this invention, one or a combination of two or more of said "amino acid metal salts" of the general structural Formula I are reacted with one or a combination of two or more anionic surface active agents of the following general structural Formula II to provide novel, water-soluble compounds having the following general structural Formula III, and having high wetting, detergency and surface active properties and capable of providing voluminous and stable foams in aqueous solutions, and which aqueous solutions are substantially non-irritating to the skin and eyes of normal human beings.

FORMULA II

$R_3$—COO—$R_4$—X—M

FORMULA III

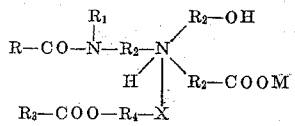

wherein $R_3$ is selected from the group consisting of (g) aliphatic and aliphatic-aromatic hydrocarbon radicals of 6–18 carbon atoms, with the aliphatic-aromatic hydrocarbon radicals, each having an aliphatic radical of at least 6 carbon atoms; $R_4$ is selected from the group consisting of (h) aliphatic hydrocarbon groups of 2–12 carbon atoms, (i) hydroxy substituted aliphatic hydrocarbon groups of 2–12 carbon atoms; (j) aliphatic ether groups, each of said groups having at least one ether oxygen linkage therein, which may be in the range of 1–6, and otherwise being hydrocarbon of 2–12 carbon atoms, (k) hydroxy substituted aliphatic ether groups, each of said groups having at least one ether oxygen linkage therein, which may be in the range of 1–6, and otherwise being hydroxy substituted hydrocarbon of 2–12 carbon atoms, (l) aliphatic groups, each group containing a —CONH— linkage therein and otherwise being hydrocarbon of 2–12 carbon atoms; X is a radical selected from the group consisting of —SO$_3$ and —OSO$_3$; R, $R_1$, $R_2$ and M have heretofore been defined.

According to this invention, I react a compound of Formula I with a compound of Formula II to provide the novel and highly useful compounds of Formula III. In general this reaction is carried out in a solution containing compounds I and II and to which a quantity of an acidic agent such as a strong mineral acid, as for example hydrochloric, sulphuric or its equivalent, has been added to lower the pH of the solution to a value of approximately 7 to approximately 9 and while maintaining the mass at a temperature between approximately 100–200° F. In this reaction under the aforesaid conditions, the compounds of Formula III are produced, said compounds having high water solubility.

Such compounds of Formula III have an unexpected extremely high water-solubility, while the corresponding salts of cationic compounds are water-insoluble. The resultant aqueous solution can be used directly as a surface active agent, wetting agent or detergent for the purposes indicated for the "amino acid metal salts." While the quantities of the compound of Formula I and compound of Formula II may be equimolecular for good yield of compounds of Formula III, I may employ an excess of either, and in general the mole ratio of a compound of Formula I to compound of Formula II may be 2 moles of the former to 1–3 moles of the latter.

One of the specific methods which I prefer to employ in carrying out an aspect of this invention is to first dissolve a compound of Formula I in water and then the pH thereof is adjusted to approximately 12–13 (measured electrically) by the addition of aqueous caustic soda if required so that when a compound of Formula II is added thereto, the pH of the solution of I and II will be at least 10 and generally 10.5–11. The temperature of said solution is raised to 100–200° F. and preferably in factory practice to approximately 140° F. Then a quantity of a compound of Formula II is dissolved in water in a separate container and this solution is added to said first solution and the mass is maintained in said temperature range while being constantly stirred, and an acidic agent is added thereto to reduce the pH thereof to a value below 10 and in the range of approximately 7 to 9, and preferably of approximately 8.2 to approximately 8.7. At the end of the acidic agent addition, the stirring is continued and the temperature of the mass maintained for about 10–20 minutes after which the solution is allowed to cool and is a finished product.

The following are specific examples merely given by way of illustrating the invention and are not to be taken by way of limitation, all parts being given by weight unless otherwise specified.

*Example 1*

An aqueous solution of 400 parts of product A in 600 parts of water is heated to approximately 140° F. and its pH (measured electrically) is adjusted by the addition of aqueous caustic soda to 12–13. While being constantly stirred and maintained at that temperature, there is added a solution of 350 parts of

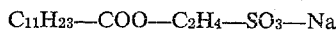

$C_{11}H_{23}$—COO—$C_2H_4$—SO$_3$—Na in 600 parts of water. Then while stirring and the temperature is maintained there is added thereto between about 30–40 parts of hydrochloric acid solution (32%) whereby the pH of the mass is lowered to a value in the range of 8.2 to 8.7. Stirring is continued and the temperature maintained for about 10 minutes more. The resultant product is a solution of the novel reaction product having the following formula:

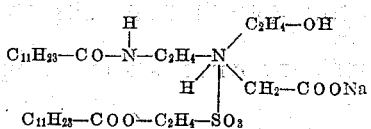

*Example 2*

Employ the same procedure and components as set forth in Example 1, except that only about 150 parts of $C_{11}H_{23}$—COO—$C_2H_4$—SO$_3$—Na is used. In this instance, the resultant product is a solution of the novel reaction product whose structural formula is shown in Example 1 together with unreacted product A used, in the approximate proportion of two parts of the former to one of the latter.

Employ the same procedure as that set forth in Example 1, but employ the components indicated in the following Examples 3–27; the quantity of hydrochloric acid solution (32%) is variable to lower the pH to values indicated in Example 1 to obtain the novel reaction products of said Examples 3–27.

*Example 3*

400 parts of product A in 600 parts of water. 310 parts of C₈H₁₆—COO—CH₂CHOHCH₂—SO₃—Na in 600 parts of water.

FORMULA OF NOVEL REACTION PRODUCT

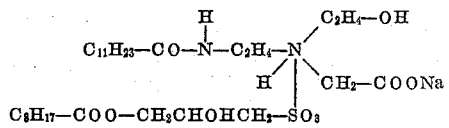

*Example 4*

400 parts of product A in 600 parts of water. 330 parts of

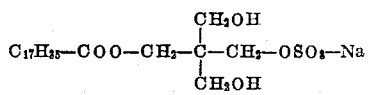

in 500 parts of water.

FORMULA OF NOVEL REACTION PRODUCT

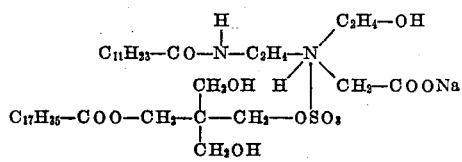

*Example 5*

400 parts of product A in 600 parts of water. 360 parts of C₉H₁₉—COO—C₂H₄OC₂H₄—OSO₃—Na in 600 parts of water.

FORMULA OF NOVEL REACTION PRODUCT

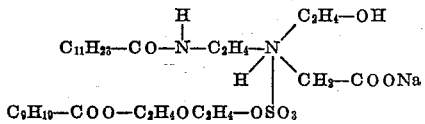

*Example 6*

400 parts of product Q in 400 parts of water. 400 parts of C₁₁H₂₃—COO—C₂H₄CHOHCH₂—OSO₃—Na in 600 parts of water.

FORMULA OF NOVEL REACTION PRODUCT

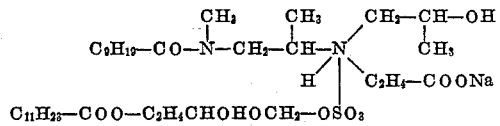

*Example 7*

550 parts of product R in 850 parts of water. 500 parts of C₁₀H₂₁—COO—C₂H₄NHCOCH₂—SO₃—Na in 600 parts of water.

FORMULA OF NOVEL REACTION PRODUCT

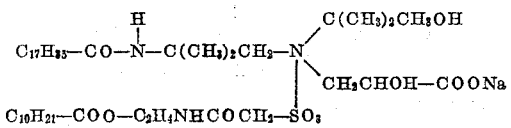

*Example 8*

450 parts of product S in 500 parts of water. 500 parts of C₆H₁₃—COO—C₂H₄OC₂H₄OC₂H₄—OSO₃—Na dissolved in 750 parts of water.

FORMULA OF NOVEL REACTION PRODUCT

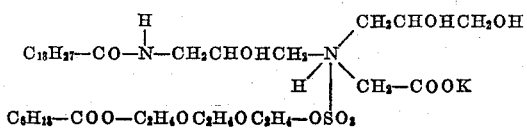

*Example 9*

450 parts of product T in 500 parts of water. 420 parts of

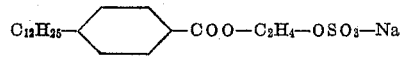

in 650 parts of water.

FORMULA OF NOVEL REACTION PRODUCT

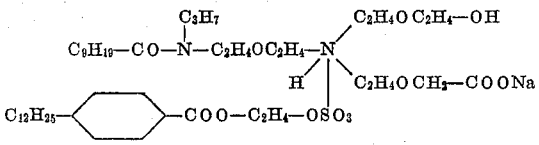

*Example 10*

400 parts of product A in 600 parts of water. 400 parts of

C₁₇H₃₅—COO—C₂H₄—SO₃—Na

FORMULA OF NOVEL REACTION PRODUCT

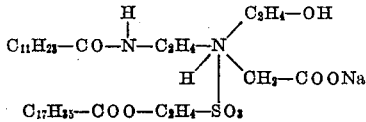

*Example 11*

450 parts of product T in 500 parts of water. 350 parts of

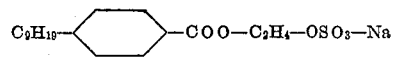

in 450 parts of water.

FORMULA OF NOVEL REACTION PRODUCT

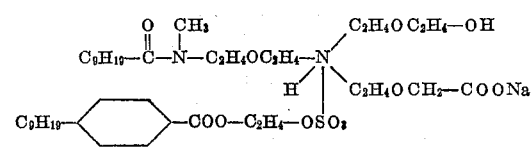

*Example 12*

550 parts of product U in 850 parts of water. 300 parts of

C₆H₁₃—COO—C₂H₄—SO₃—Na in 450 parts of water.

FORMULA OF NOVEL REACTION PRODUCT

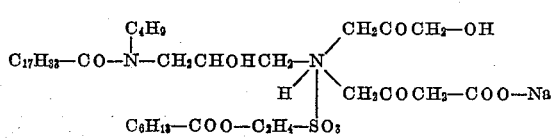

*Example 13*

550 parts of product U in 850 parts of water. 400 parts of

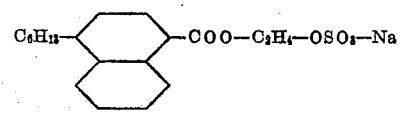

in 600 parts of water.

FORMULA OF NOVEL REACTION PRODUCT

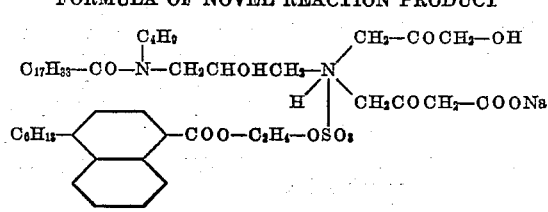

Example 14

400 parts of product A in 600 parts of water. 300 parts of $$C_6H_{13}—COO—CH_2CHOHCH_2—OSO_3—Na$$

in 450 parts of water.

FORMULA OF NOVEL REACTION PRODUCT

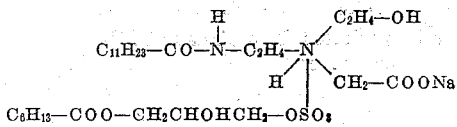

$$C_6H_{13}—COO—CH_2CHOHCH_2—OSO_3$$

Example 15

550 parts of product V in 800 parts of water. 400 parts of $$C_{13}H_{27}—COO—C_2H_4—SO_3—Na$$

in 600 parts of water.

FORMULA OF NOVEL REACTION PRODUCT

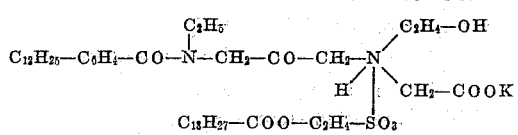

$$C_{13}H_{27}—COO—C_2H_4—SO_3$$

Examples 16–20

Employing the same procedure as that set forth in Example 1, except that products B, K, L, M, and N are respectively substituted for product A to provide novel reaction products which differ from the novel reaction product whose formula is shown in Example 1, by substituting for the $C_2H_4$—OH radical thereof, the following respective radicals:

$C_2H_4OC_2H_4$—OH, $CH_2CHOHCH_2$—OH $CH_2C(CH_2OH)_2$—OH, $CH_2COCH_2$—OH $CH_2COCHOH$—OH

Examples 21–24

Employing the same procedure as that set forth in Example 1, except that products D, E, G and H are respectively substituted for product A to provide novel reaction products, which differ from the novel reaction product whose formula is shown in Example 1, by substituting for the $C_{11}H_{23}$ radical thereof the following respective radicals:

$C_{17}H_{31}$, $C_5H_{11}$, $C_{12}H_{25}$—$C_6H_4$ and $C_{13}H_{27}$

Example 25

Employing the same procedure as that set forth in Example 1, except that product P is substituted for product A to provide a reaction product which differs from the novel reaction product, whose formula is shown in Example 1, by substituting for the $CH_2$—COONa radical the following radical: $CH_2$—CHOH—COONa.

Examples 26 and 27

Employing the same procedure as that set forth in Example 1, except that products C and F respectively are substituted for product A to provide novel reaction products which differ from the novel reaction product whose formula is shown in Example 1, by substituting $C_2H_4$—COONa for the $CH_2$—COONa and also substituting $C_9H_{19}$ and $C_{17}H_{35}$ respectively for $C_{11}H_{23}$.

Examples 28–40

Employing the same procedure as that set forth in Example 3, except that, instead of product A, there are respectively substituted compounds which are the same as product A, except that the H of the NH attached directly to the CO group thereof is replaced by the following respective radicals:

—$CH_3$, —$C_2H_5$, —$C_3H_7$, —$C_4H_9$, —$C_2H_4OH$,
—$CH_2CHOHCH_2$, —$CHOHCHOHCH_2OH$,
—$C_2H_4OCH_3$, —$C_2H_4OC_2H_4OH$, —$CH_2CHOHOC_2H_5$,
—$CH_2COCH_3$, —$C_2H_4COC_2H_4OH$, —$CH_2OHCOC_2H_5$ whereby there are produced a number of other novel reaction products whose formulas are the same as the formula of the novel reaction product whose formula is within the definition of Formula III and shown in Example 3, except that the aforesaid respective radicals replace the H of the NH connected directly to the CO thereof.

The specific reactants of Formula II employed herein may differ from those used in the aforesaid examples by substituting $SO_3$ for $OSO_3$ and vice-versa, for they are equivalents.

Following the same procedure as that set forth in Example 1 and employing 1 mol of any of said other starting materials, such as products E–H, J–N, P–V, respectively and 1 mol of any of the other specific compounds of Formula II employed in Examples 1–40, a great number of other novel reaction products whose formulas are that of Formula III may be produced; and in addition, the specific reactants employed may differ from those employed herein, in varying R, $R_1$, $R_2$, and $R_3$ within the definitions thereof, to provide a great number of other compounds of Formula III.

It is to be understood that instead of first adjusting the pH of the compound of Formula I to 12–13 before the addition of the compound of Formula II, any other method may be employed to obtain the condition whereby the pH of the solution of I and II is at least 10 and preferably 10.5–11 before the addition of the acidic agent to lower the pH of the mass to approximately 7 to approximately 9. For example, I and II may be dissolved together and this solution may, by the addition of caustic soda when required, have its pH adjusted to at least 10, and then at 100–200° F. is ready for the addition of the acidic agent to lower its pH to approximately 7 to approximately 9. If desired, the required amount of acidic agent may be added either before or after the solution of pH of at least 10 is brought to a temperature in the range of 100–200° F.

Since certain changes in carrying out the aforesaid processes and certain modifications in the compositions which embody the invention may be made without departing from its scope, it is intended that all matter contained in the description shall be interpreted as illustrative and not in a limiting sense.

It is also to be understood that the following claims are intended to cover all the generic and specific features of the invention herein described, and all statements of the scope of the invention which as a matter of language might be said to fall therebetween.

I claim:

1. A compound of the following formula:

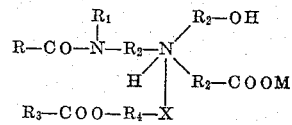

in which R is a hydrocarbon radical of 4–18 carbon atoms; $R_2$ is an organic group selected from the class consisting of (a) aliphatic hydrocarbon groups of 1–4 carbon atoms, (b) hydroxy substituted aliphatic hydrocarbon groups of 1–4 carbon atoms, (c) aliphatic ether groups, each of said ether groups having an ether oxygen linkage therein and otherwise being hydrocarbon of 2–4 carbon atoms, (d) aliphatic ether groups, each of said groups having an ether oxygen linkage therein and otherwise being hydroxy substituted hydrocarbon of 2–4 carbon atoms, (e) aliphatic keto groups, each of said groups having a carbonyl linkage therein and otherwise being hydrocarbon of 2-4 carbon atoms, (f) aliphatic keto groups, each of said groups having a carbonyl linkage therein and otherwise being hydroxy substituted hydrocarbon of 2-4 carbon atoms; $R_1$ is selected from the group consisting of hydrogen and monovalent radicals otherwise defined in said (a)-(f); $R_3$ is selected from the group consisting of (g) aliphatic and aliphatic-aromatic hydrocarbon radicals of 6-18 carbon atoms, with the aliphatic-aromatic hydrocarbon radicals, each having an aliphatic radical of at least 6 carbon atoms; $R_4$ is selected from the group consisting of (h) aliphatic hydrocarbon groups of 2-12 carbon atoms, (i) hydroxy substituted aliphatic hydrocarbon groups of 2-12 carbon atoms, (j) aliphatic ether groups, each of said groups having at least one ether oxygen linkage therein, and otherwise being hydrocarbon of 2-12 carbon atoms, (k) hydroxy substituted aliphatic ether groups, each of said groups having at least one ether oxygen linkage therein, and otherwise being hydroxy substituted hydrocarbon of 2-12 carbon atoms, (1) aliphatic groups, each group containing a —CONH— linkage therein and otherwise being hydrocarbon of 2-12 carbon atoms; X is a radical selected from the group consisting of —$SO_3$ and —$OSO_3$; and M is an alkali metal.

2. A compound of the following formula:

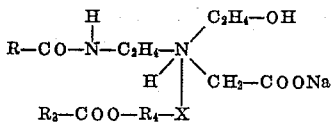

in which R is aliphatic hydrocarbon radical of 6-18 carbon atoms; $R_3$ is aliphatic hydrocarbon group of 6-18 carbon atoms; $R_4$ is aliphatic hydrocarbon group of 2-12 carbon atoms, and X is selected from $SO_3$ and $OSO_3$.

3. A compound of the following formula:

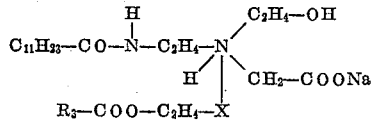

in which $R_3$ is aliphatic hydrocarbon radical of 6-18 carbon atoms, and X is selected from $SO_3$ and $OSO_3$.

4. A compound of the following formula:

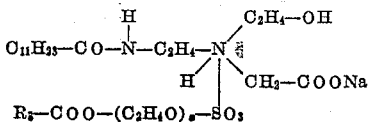

in which $R_3$ is aliphatic hydrocarbon radical of 6-18 carbon atoms, and x is 1-5.

5. A compound of the following formula:

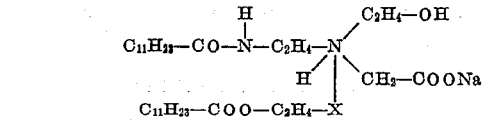

in which X is selected from $SO_3$ and $OSO_3$.

6. A compound of the following formula:

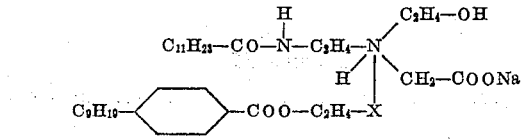

in which X is selected from $SO_3$ and $OSO_3$.

7. A compound of the following formula:

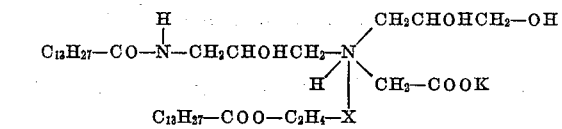

in which X is selected from $SO_3$ and $OSO_3$.

8. A novel compound of the following formula:

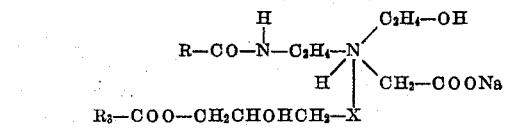

in which R is a hydrocarbon radical of 4-18 carbon atoms, $R_3$ is an aliphatic hydrocarbon radical of 6-18 carbon atoms and X is selected from the group consisting of $SO_3$ and $OSO_3$.

References Cited in the file of this patent

UNITED STATES PATENTS

| | | |
|---|---|---|
| 2,103,872 | Schoeller et al. | Dec. 28, 1937 |
| 2,271,707 | Munz et al. | Feb. 3, 1942 |
| 2,329,406 | Mauersberger | Sept. 14, 1943 |
| 2,391,830 | Jayne et al. | Dec. 25, 1945 |
| 2,599,391 | Katzman | June 3, 1952 |